(12) United States Patent
Campbell

(10) Patent No.: US 10,175,028 B2
(45) Date of Patent: Jan. 8, 2019

(54) DEVICE FOR USE WITH A TARGET VIEWING DEVICE

(71) Applicant: Robert Marshall Campbell, Miami, FL (US)

(72) Inventor: Robert Marshall Campbell, Miami, FL (US)

(*) Notice: Subject to any disclaimer, the term of this patent is extended or adjusted under 35 U.S.C. 154(b) by 65 days.

(21) Appl. No.: 15/223,691

(22) Filed: Jul. 29, 2016

(65) Prior Publication Data

US 2017/0030679 A1    Feb. 2, 2017

Related U.S. Application Data

(60) Provisional application No. 62/387,778, filed on Jan. 4, 2016, provisional application No. 62/358,103, filed on Jul. 4, 2016, provisional application No. 62/282,267, filed on Jul. 29, 2015, provisional application No. 62/387,777, filed on Jan. 4, 2016.

(51) Int. Cl.
| | |
|---|---|
| *F41G 1/30* | (2006.01) |
| *G02B 7/182* | (2006.01) |
| *F41G 1/40* | (2006.01) |
| *F41G 1/46* | (2006.01) |

(52) U.S. Cl.
CPC .............. *F41G 1/30* (2013.01); *F41G 1/40* (2013.01); *G02B 7/1824* (2013.01); *F41G 1/46* (2013.01)

(58) Field of Classification Search
CPC .............. F41G 1/30; F41G 1/40; F41G 1/41
See application file for complete search history.

(56) References Cited

U.S. PATENT DOCUMENTS

| | | | | |
|---|---|---|---|---|
| 1,227,544 | A * | 5/1917 | Lobdell .................... | F41G 1/01 356/255 |
| 3,863,354 | A * | 2/1975 | Karppinen ................ | F41G 1/30 356/254 |
| 5,339,792 | A * | 8/1994 | McCain .................... | F41G 1/467 124/87 |
| 7,552,558 | B1 * | 6/2009 | Ballard .................... | F41G 1/01 356/255 |

* cited by examiner

*Primary Examiner* — Stephen Johnson

(57) ABSTRACT

A device for use with a target viewing device comprising a collet comprising having a central opening defined by a first part and a second part. The second part is rotatably coupled to the first part such that the second part rotates relative to the first part. An attaching member fixedly couples the first part proximate to the target viewing device such that the central opening does not obstruct an image provided to and from the target viewing device. A mirror is pivotally coupled to a planar body so that the mirror may pivot about a hinge to position the mirror relative to the target viewing device to provide a reflection of an image provided by the target viewing device to the user when the device is positioned behind the target viewing device, and to provide a reflection of an image to the target viewing device when the device is positioned in front of the target viewing device.

20 Claims, 10 Drawing Sheets

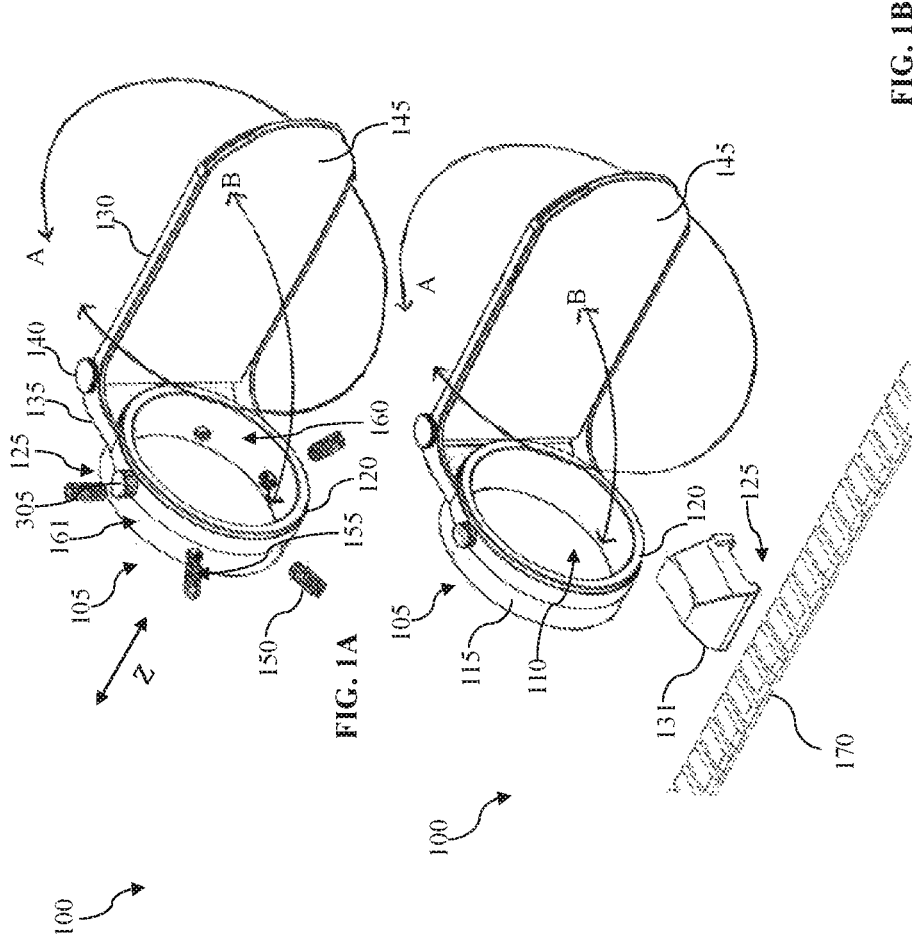

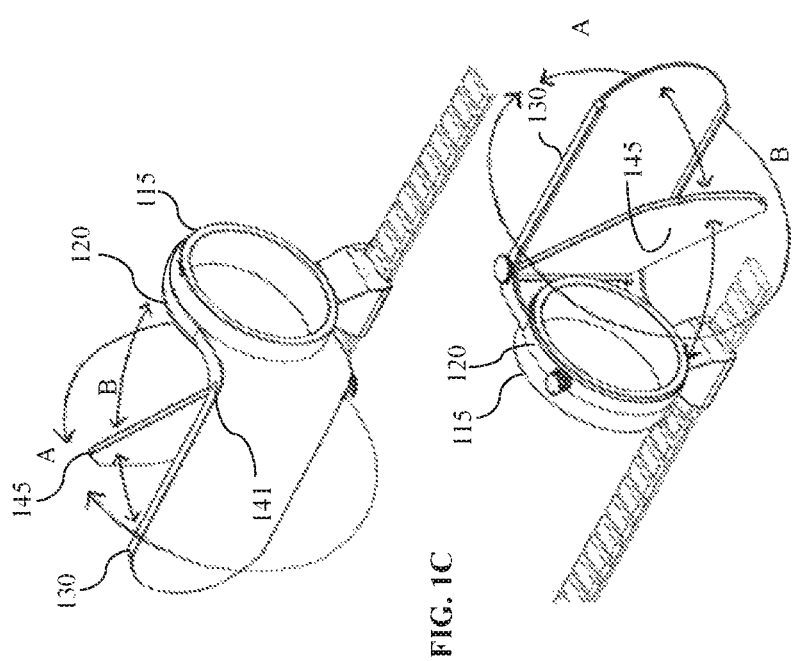

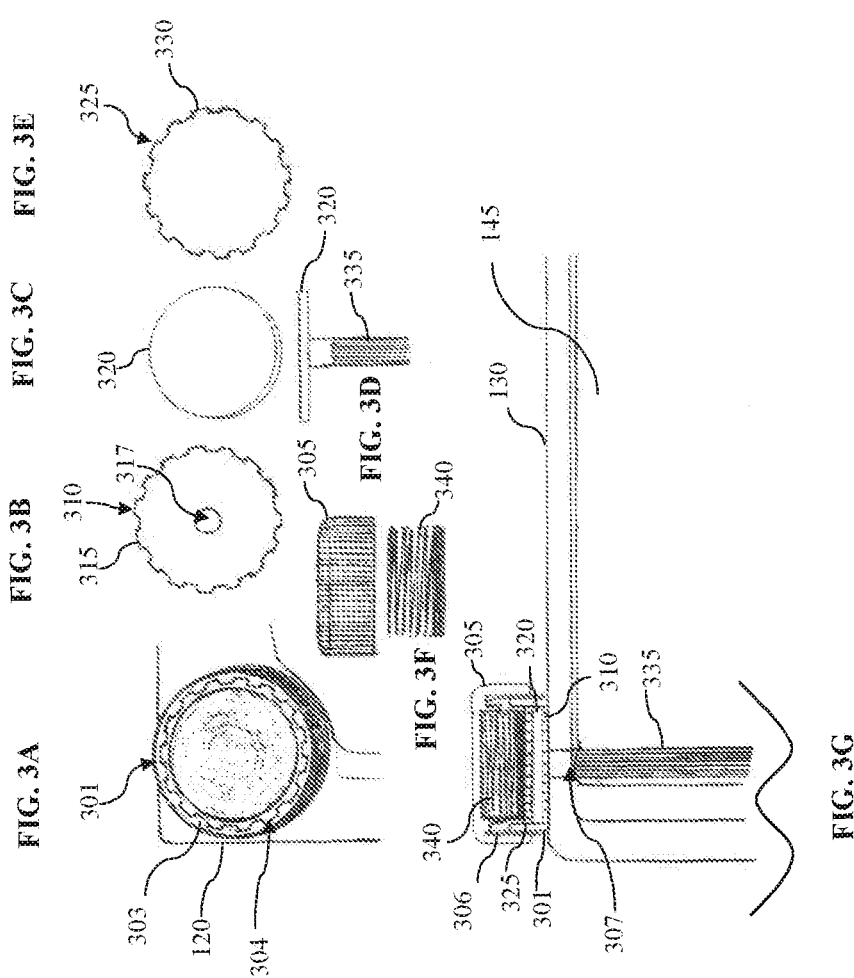

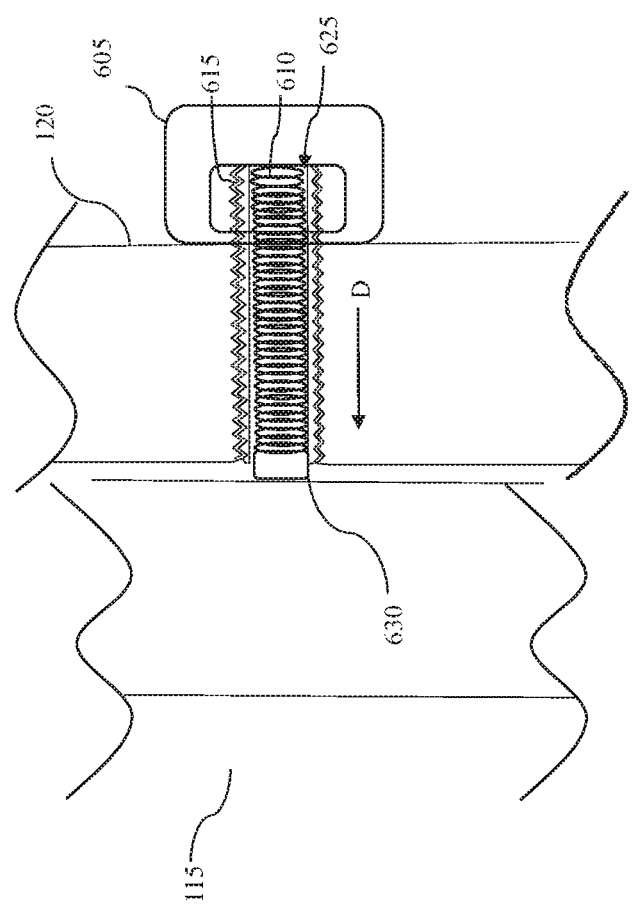

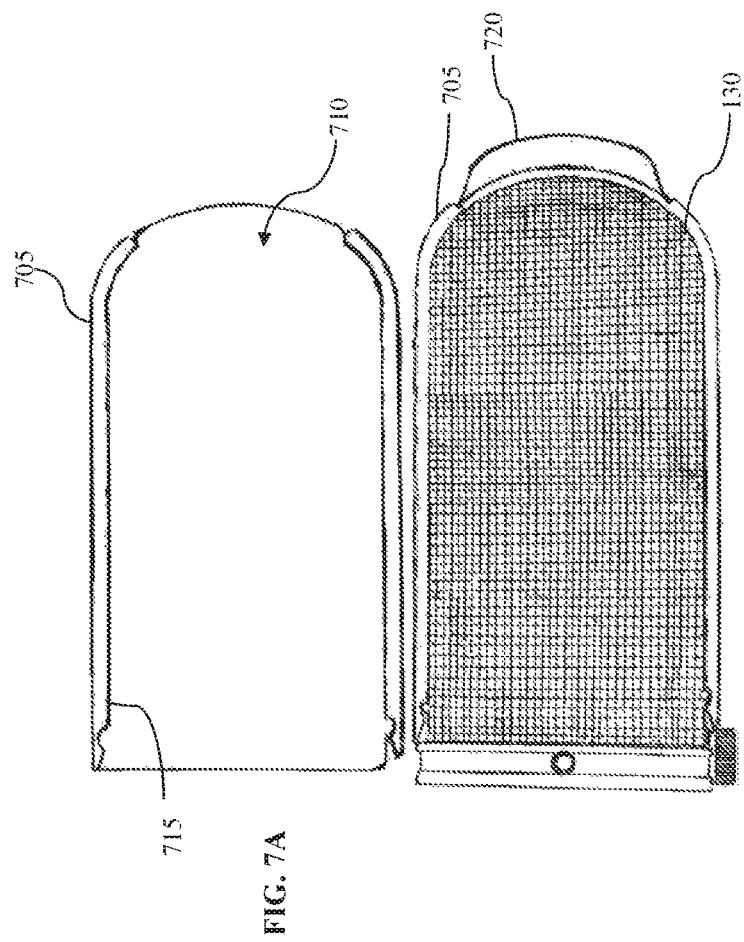

DEVICE FOR USE WITH A TARGET VIEWING DEVICE

CROSS-REFERENCE TO RELATED APPLICATIONS

This patent application claims priority to provisional patent application No. 62/387,777 filed on Jan. 4, 2016, claims priority to provisional patent application No. 62/387,778 filed Jan. 4, 2016, claims priority to provisional patent application No. 62/358,103 filed Jul. 4, 2016, and claims priority to provisional patent application 62/282,267 filed Jul. 29, 2015. The subject matter of patent application Nos. 62/387,777, 62/387,778, 62/358,103 and 62/282,267 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to firearms and, more specifically, to processes for sights for firearms.

BACKGROUND

First responders, soldiers and law enforcement personnel often encounter violent actors or offenders who carry pistols, rifles and other weapons. In military scenarios, battles and other military operations often occur in urban theaters requiring armed forces to patrol towns and cities. Patrols of dangerous areas must often take cover behind obstacles, such as buildings, cars, and homes and fire their weapons at close range around such structures. Taking cover behind a structure, however, can eliminate a clear, linear view of the target. If a combatant's body is completely behind cover, he does not have the ability to locate subjects and conduct surveillance accurately around the corner of an obstacle without exposing himself to danger. Various solutions to this problem have been proposed in the literature. One of the problems with the currently available solutions to this problem is the complexity of the solutions. Many of the currently available solutions include a color video monitor, folding stock and various complicated and expensive accessories. Due to the complexity of these solutions and the many high-tech electronic components employed, the price of these solutions are often unaffordable for many small entities, such as militias, micro-states, and police departments. Repair and service of the currently available solutions can also be cost prohibitive.

Therefore, a need exists for improvements over the prior art, and more particularly for methods and systems that provide a more efficient system for allowing combatants to remain fully behind cover while having the ability to locate subjects and conduct surveillance accurately around an obstacle.

SUMMARY

A device for use with a target viewing device is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a device for use with a target viewing device is provided that solves the above-described problems. A device for attaching in front of and behind a target viewing device of a firearm. In one embodiment, the device comprises a collet comprising at least a central opening defined by a first part and a second part. The second part is rotatably coupled to the first part such that the second part rotates relative to the first part and about the collet's z axis. At least one attaching member is configured to fixedly couple the first part of the collet proximate to the target viewing device such that the central opening does not obstruct an image provided to and from the target viewing device. A planar body is planar body coupled perpendicular to the second part. A mirror is pivotally coupled to the planar body via a hinge so that the mirror may pivot about the hinge to position the mirror relative to the target viewing device to provide a reflection of an image provided by the target viewing device to the user when the device is positioned behind or on the rearward end of the target viewing device, and to provide a reflection of an image to the target viewing device when the device is positioned in front or on the forward end of the target viewing device.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 1A is a semi-exploded perspective view of the device for use with a target viewing device, wherein an attaching member is a plurality of fasteners for clamping the device on a target viewing device, according to an example embodiment;

FIG. 1B is a semi-exploded perspective view of the device for use with a target viewing device, wherein an attaching member is a base for coupling the device to a top surface of a rail mount, according to an example embodiment;

FIG. 1C is a first perspective view of the device for use with a target viewing device, wherein the base couples the device to a top surface of a rail mount, and wherein the mirror is positioned in an in-use position, according to an example embodiment;

FIG. 1D is a second perspective view of the device for use with a target viewing device, wherein the base couples the device to a top surface of a rail mount, wherein the mirror is positioned to be in an in-use position, according to an example embodiment;

FIG. 3A is a top perspective view of a housing of the tensioning device of the mirror attached to the planar body of the device, wherein FIG. 3A illustrates the inside of the threaded housing, according to an example embodiment;

FIG. 3B is a top view of a first plate with teeth of the tensioning device for the mirror, according to an example embodiment;

FIG. 3C is a perspective view of a disc of the tensioning device for the mirror, according to an example embodiment;

FIG. 3D is a side view of the disc mounted on to a shaft of the tensioning device for the mirror, according to an example embodiment;

FIG. 3E is a top view a second plate with teeth of the tensioning device for the mirror, according to an example embodiment;

FIG. 3F is a side exploded view of a knob and spring of the tensioning device for the mirror, according to an example embodiment;

FIG. 3G is a side cross-sectional view of a portion of the fully assembled tensioning device, according to an example embodiment;

Figure 4:
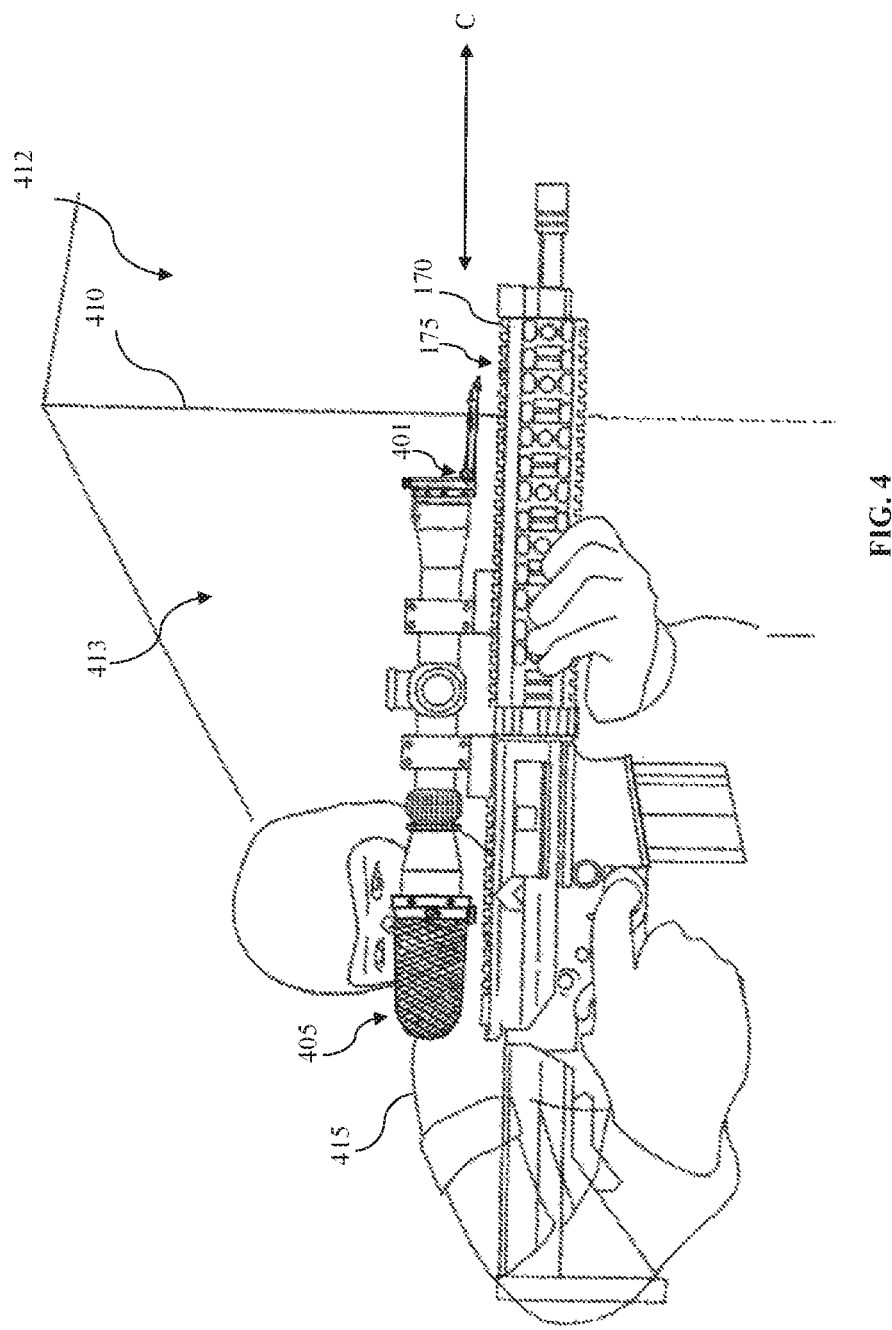
Figure 5:
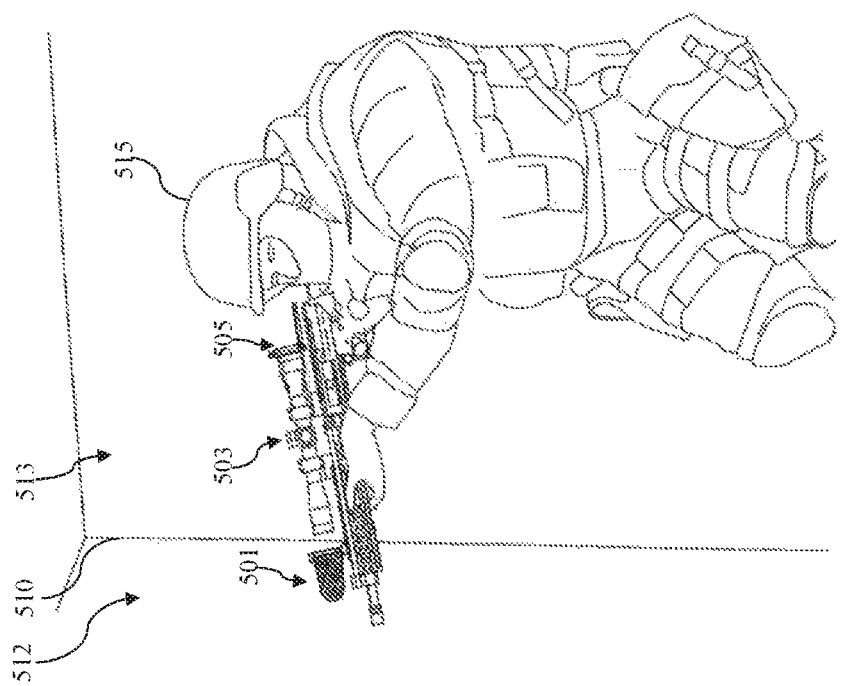
Figure 7C:
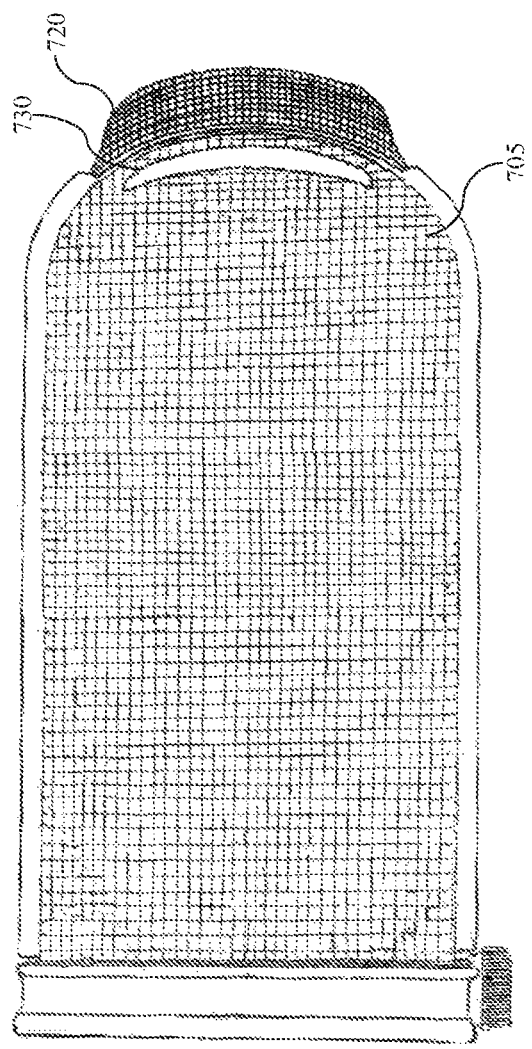

FIG. 4 is a drawing illustrating a pair of the devices used with a target viewing device allowing a user to remain fully behind cover while having the ability to locate subjects and conduct surveillance accurately around an obstacle, wherein a first device is mounted on a forward end of the target viewing device, wherein the mirror of the first device is in the not-in-use state, and wherein the second device is on the rearward end of the targeting device, and wherein the mirror of the second device is in the in-use state;

FIG. 5 is a drawing illustrating a pair of the devices used with a target viewing device allowing a user to remain fully remain fully behind cover while having the ability to locate subjects and conduct surveillance accurately around an obstacle, wherein a first device is positioned in front of the target viewing device, wherein the mirror of the first device is in the in-use state, and wherein the second device is positioned behind the targeting device, and wherein the mirror of the second device is in the not-in-use state;

FIG. 6 is a cross-sectional side view of the tensioning device, according to one example embodiment;

FIG. 7A is a front view of a cover for the device, according to an example embodiment;

FIG. 7B is a rear view of the planar body with the cover attached thereto, wherein the mirror is sandwiched between the planar body and the cover, according to an example embodiment; and, FIG. 7C is a rear view of the cover attached to the planar body of the device, wherein the mirror is sandwiched between the planar body and the cover, according to an example embodiment.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a simple, low cost and easy-to-use system or device for allowing combatants to remain fully behind cover while having the ability to locate subjects and conduct surveillance accurately around an obstacle.

Referring now to the Figures, FIG. 1A is a semi-exploded perspective view of the device 100 for use with a target viewing device. FIG. 1B is a semi-exploded perspective view of the device for use with a target viewing device or sight. It is understood for the purposes of this application that the term viewing device or sight may include night vision goggles, a sight, a scope, telescope etc.) It is also understood that while the illustrations do not include a handgun or pistol, the device may also be used with handguns and pistols. Additionally, it is also understood that in certain embodiments only one device may be used in order for the device to provide the desired effect. Additionally, when the device is in the not-in-use state it does not obstruct the operation of the target viewing device and a user operate the target viewing device normally.

The system includes a collet 105. The collet defines a central opening 110 also includes at least a first part 115 and the second part 120. The central opening is configured so that it does not obstruct an image provided by or to the site or target viewing device. The collect includes first part 115 or first ringed part, tubular part, band or sleeve. The second part 120, ringed part, tubular part, band or sleeve is put around and rotatably coupled to the first part such that the second part rotates relative to the first part and about the collet's z axis (line Z) in the direction of Line B. In one embodiment the first part may be a short tubular shaped element having a channel on the outside body of the first part, wherein the channel is configured to receive the second part therein so that the second part may rotate around the first part. The collet may include bearing elements or bearings that allow the second part to more easily rotate around the first part. The collet may also include a tensioning device that prevents the second part from moving relative to the first part or creates a type of friction lock or a device that provides drag to prevent the second part from moving easily relative to the first part.

Jumping to FIG. 6, FIG. 6 is a cross-sectional side view of the tensioning device, according to one example embodiment. In one embodiment, the tensioning device may include a cap or knob 605 that includes a threaded hole 620 therein. The threaded hole in the knob is configured to receive a tubular screw 615 or a threaded protrusion that extends beyond the surface of the second part having a threaded section on the outside of the screw. The tubular screw is configured to receive a compression spring 610. The compression spring is also configured to be received inside of the threaded hole of the knob such that the first end of the compression spring engages with the backend of the hole of the knob. A place or disc 630 is coupled to a second end of the spring. In operation, a threaded opening 625 on the second part 120 of the collet is configured to receive threaded tubular screw. The compression spring is positioned such that the disc on the second end of the compression spring is located between the body of the first part 115 of the collet and the second part 120. The first end of the compression spring engages the back wall of the knob and the disc 630 on the second end engages the first part of the collet when the knob is screwed onto the tubular screw. In operation, the force of the compression spring forces the disc 630 inward (in the direction of line D) towards the outward facing surface of the first part 115. This causes friction or a force that prevents movement or rotating of the second part 120 relative to the first part. In order words, it allows the second part to remain in adjustment after rotational adjustment has been made.

Moving back to FIG. 1A, FIG. 1A also illustrates one embodiment of the attaching member 125. In one embodiment, the attaching member includes a plurality of threaded holes 155 that is each adapted to receive a threaded fastener 150. In operation, in order to use the attaching member, a user would position the collet such that the inward facing surface 160 abuts the outward facing surface of the target viewing device. Next, a user would screw the fasteners or screws 150 into each of the plurality of threaded openings 155 so as to couple a portion of the first part of the collet to the outward surface of the target viewing device. However, the inward facing surface of the first part may also include a threaded section that is adapted to couple with a matching or making threaded section on an end of a target viewing device.

In FIG. 1B the attaching member 125 is a base 131 for coupling the device to a top surface of a rail mount. The rail mount 170 is configured for coupling with multiple firearm accessories. The rail mount 170 may be positioned on top the top surface 175 of the firearm. The base may be coupled to the outward facing surface 161 first part of the collet.

The rail may be a Weaver rail mount, a Picatinny rail, a Rail Integration System a UIT rail, a NATO Accessory rail or the like. A Weaver rail mount is a system to connect telescopic sights and other accessories to rifles, shotguns, pistols, and other firearms. A Weaver rail mount uses a pair of parallel rails and several slots perpendicular to these rails. A Weaver system may use two pieces mounted a distance apart from one another typically on the receiver of a rifle over the bolt opening where the cartridge would be inserted and/or ejected. The slots on a Weaver system are primarily used as a clearance of the locking screw that tightens the clamp to the rail. The Picatinny rail, or tactical rail, is a bracket that provides a standard mounting platform consisting of rails with multiple transverse slots similar in concept to the Weaver rail mount used to mount telescopic sights. The Picatinny rail is either fitted to or machine milled into the upper, side and lower surfaces of firearms. Accessories can be mounted to the Picatinny rail by sliding into place.

A planar body 130 is attached perpendicularly to the second part 120. In the present embodiment, the planar shaped body 130 attached by an arm 135 to the outward facing surface of the second part of the collet. However, it is understood that more than one army also be used to attach to the planar shaped body to the second part. In the present embodiments the planar shaped body is somewhat rectangular shaped. However, it is understood that other shapes and sizes are within the scope of the present invention.

The device also includes a mirror 145 pivotally coupled to the planar body via a hinge so that the mirror may pivot about the hinge to position the mirror relative to the sight or target viewing device. In operation, when the device is positioned in front of or at a front end of the target viewing device or sight, the mirror may pivot about the hinge (in the direction of Line B) to position the mirror relative to the target viewing device to provide a reflection of an image to the target viewing device. Additionally, the mirror is pivotally coupled to the planar body via the hinge so that when the device is positioned behind the target viewing device or sight, the mirror may pivot about the hinge (in the direction of Line B) to position the mirror relative to the target viewing device to provide a reflection of an image provided by the target viewing device to the user.

A hinge is a mechanical bearing that connects two solid objects, such as the mirror and the planar shaped body or directly to the second part, typically allowing only a limited angle of rotation between them. Two objects connected by an ideal hinge rotate relative to each other about a fixed axis of rotation. Hinges may be made of flexible material or of moving components. One common type of hinge that may be used with the mirror is a barrel hinge, which includes a sectional barrel secured by a pivot. A barrel is a component of a hinge that has a hollow cylinder shaped section where the rotational bearing force is applied to the pivot, and may also have a screw shaped section for fastening and/or driving the pivot. Another common type of hinge that may be used with the mirror is a pivot hinge. A pivot hinge pivots in openings in the firearm or rail and optionally in the mirror as well. Yet another common type of hinge that may be used with the mirror is a butt hinge. A butt hinge is grouped in sets of 3 or 4 and may be inset (mortised) into the firearm or rail and optionally in the mirror as well. The hinge may be composed of steel, brass, stainless steel, aluminum, alloys or the like. The hinge may also be composed of plastic, polymers or the like.

In the present embodiment, the mirror is tongue shaped. However, it is understood other embodiments that are within the spirit and scope of the present invention may also be used. The mirror is configured to be rotated about the hinge so as to retract the mirror and refrain from obstructing the image provided by the target viewing device directly to the user when the device is used with a target viewing device. This is the case whether the device is positioned in front of the target viewing device, behind the target viewing device, at a forward end of a target viewing device or at a target viewing device. As a result, when in not-in-use state, a user may use the target viewing device as if the device was not attached to the firearm.

FIG. 1C is a first perspective view of the device 100 for use with to a target viewing device or sight. In FIG. 1C the base 131 couples the device to a rail mount. The mirror 145 is in an in-use position and positioned to be in the line of sight of the target viewing device according to an example embodiment. In the in-use position, and when positioned in front of the target viewing device, the mirror will reflect the image in the line of sight of the mirror into a first end or fore-end the target viewing device which then can be been seen at the second end or the rearward end of the target viewing device. As a result, when the device is positioned in front of the target viewing device as illustrated in FIG. 1C, the mirror be pivoted about the hinge to reflect an image in direct view of the mirror into the first end or fore end of the target viewing device. When the device is positioned behind the target viewing device or at a rearward end of the target viewing device, the second part 120 may be rotated about the collet's z axis (represented by line Z), and the mirror may be pivoted about the hinge to reflect the image provided by the target viewing device to the user, at any position of the user in relation to the firearm. Similarly, when the device is positioned in front of or at the forward end of the target viewing device, the second part may be rotated about the collet's z axis, and the mirror may be pivoted about the hinge to reflect the image provided to the target viewing device, wherein the image is in any position in direct view of the mirror.

FIG. 1D is a second perspective view of the device for use with a target viewing device or sight. The base couples the device to a top surface of a rail mount and wherein the mirror is positioned to be in an in-use position. In the in use position, and when positioned behind the target viewing device, the mirror will reflect the image provided by the target viewing device to the user. When the device 100 is positioned behind the target viewing device, the second ring part 120 of the collet may be rotated about the first part 115 z axis (illustrated as Line Z). Additionally, the mirror may be pivoted about the hinge to reflect the image provided by the target viewing device to the user at any position of the user in relation to the target viewing device. The fact that the second part be rotated 360° about the second part increases the functionality of the device. The rotational feature combined with the hinging feature of the mirror provides a greater amount of angles from which a user may view objects when the device is positioned behind or at the rearward end of the target viewing device and also it provides a greater amount of angles from which a user may view objects when the device is positioned in front of or at the forward end of the target viewing device.

Figure 2:
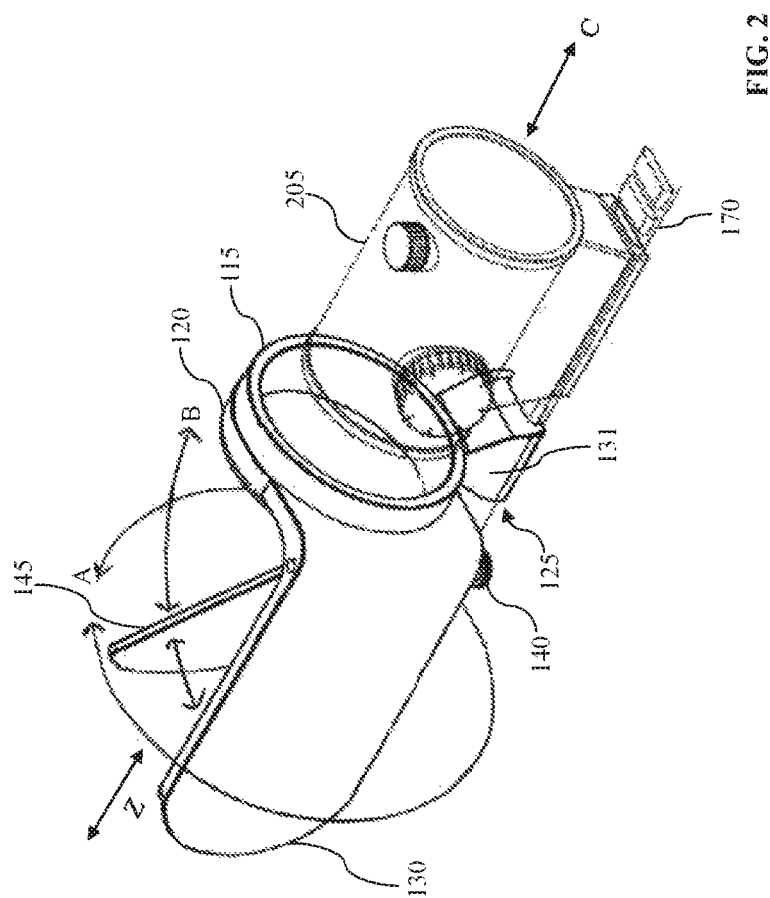
FIG. 2 is a perspective view of the device for use with a target viewing device, wherein the mirror is in the in-use position, and wherein the base couples the device to a top surface of a rail mount, according to an example embodiment.

FIG. 2 is a perspective view of the device attached or mounted in front of a target viewing device. In FIG. 2 the mirror 145 is in the in-use position, and the base 131 couples the device to a top surface of a rail mount 170, according to an example embodiment. As mentioned before, the hinge (which may include a hinge pin 131) and a knob 140. A user may use apply forces to the mirror or the handle of the mirror (as illustrated as 720 in FIG. 7B) to pivot the mirror in direction of line B between the in-use and not-in-use state. When the mirror is in the in-use state, the mirror reflection images into the first end or fore end of the target viewing device. As a result, the user may view images at an increased amount of angles off the longitudinal axis (represented by line C) of the target viewing device. In other embodiments, it is understood that other attaching devices may also be used to mount the first part of the collet to and end of the target viewing device. The mirror is rotated about the hinge in the direction of line B to retract to move the mirror into the not in-use position so that the mirror refrains from obstructing the image provided to the target viewing device when the device is positioned in front of the target viewing device. Additionally, the second part 120 it may be rotated about the first part so that the mirror can provide views 360° around the longitudinal axis (represented by line C) of the target viewing device.

Figure 3:
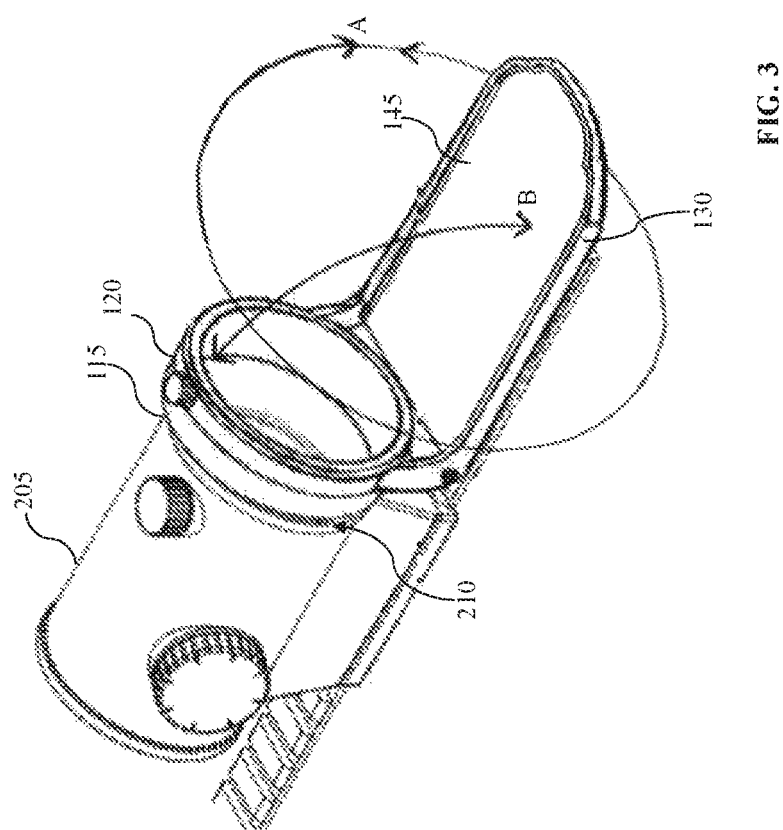
FIG. 3 is a perspective view of the device attached on a rearward end of a target viewing device, wherein the mirror is not-in-use position, according to an example embodiment.

FIG. 3 is a perspective view of the device attached or mounted behind or on the rearward end of a target viewing device and the mirror is not in the in-use or retracted position. The device 100 is mounted on the target viewing device, according to an example embodiment. In one embodiment, the target viewing device is configured to be mounted on top of a firearm. In the present embodiment, the attaching member 125 may be in a threaded portion on the outside surface of the rearward end of the target viewing device and a mating or matching threaded surface on the inside surface of the first ringed part 115 or first part of the collet. In other embodiments, the attaching device may be similar to that illustrated in FIG. 1A, and may include a plurality of threaded fasteners configured to pass through a threaded opening on the first part of the collet so as to engage a portion of the outward facing surface 210 of the target viewing device.

In FIG. 3, the mirror 145 is in the retracted or not-in-use state. When in the not-in-use state, the user may view an image provided by the target viewing device as the user normally would use the target viewing device. As mentioned above, in operation the user may apply forces to pivot the mirror 145 along line B and into the in-use state.

Applicant's device can also can be mounted and used with a full range of functionality and use either with device mounted behind existing sights on firearm to view reflected image coming through existing sights on firearm with user positioning himself to either side, over, under, or from any position that user would position himself in relationship to firearm but can also be used when device is mounted in front of these sights or by itself out towards the end of firearm's muzzle on a rail mount as a surveillance device to locate targets with the firearm up to his or her shoulder in the conventional manner viewing reflected image from device coming through target viewing devices mounted on weapons rail behind device. However the device can also be used with the naked eye viewing targets with device mounted out on the end of weapons rail so targets can be located with nothing but muzzle of firearm sticking out beyond wall or other fortified or bulletproof structure user would position himself behind so in other words, with two or more of these devices mounted on firearms rail system located on both sides of viewing devices on firearms rail mount, the forward one can be folded up or popped up, with the rear one in the not-in-use, using device for surveillance or to locate and pinpoint targets. When the target is located, the forward device can quickly and easily be pushed down or locked into position of not-in-use with other one mounted behind sight viewing device, such as red dot viewing sight, can be used to pinpoint and fire on target with user never having to become a target in any way. In other words, none of the prior art can be used in this manner so overall versatility and range of function of Applicant's device radically surpasses anything else on the market.

FIG. 3A-3G will be discussed together. A tensioning device or friction lock may also to assist in maintaining the mirror in a variety of different positions. A tension adjusting knob 305 may be used to adjust the tension or drag on the mirror to keep the mirror in position despite recoil forces of any firearm. Naturally the more recoil a firearm has, the more tension or drag on the mirror tensioning device is necessary. The tensioning device would allow the mirror to remain in the chosen position. FIG. 3A is a top perspective view of a housing 301 of the tensioning device of the mirror attached to the planar body 130, wherein FIG. 3A illustrates the inside of the threaded housing, according to an example embodiment. FIG. 3B is a top view of a first plate 310 with teeth 315 of the tensioning device for the mirror, according to an example embodiment. The first plate includes an opening or hole 317 so that the shaft may pass there through. FIG. 3C is a perspective view of a disc 320 of the tensioning device for the mirror, according to an example embodiment. FIG. 3D is a side view of the disc mounted on to a shaft 335 of the tensioning device for the mirror, according to an example embodiment. FIG. 3E is a top view a second plate 325 with teeth 330 of the tensioning device for the mirror, according to an example embodiment. FIG. 3F is a side exploded view of a knob 305 and spring 340 of the tensioning device for the mirror, according to an example embodiment. FIG. 3G is a side cross-sectional view of a portion of the fully assembled tensioning device, according to an example embodiment. The housing has a threaded outside and is attached to or is integral with the outward facing surface of the planar body or arms 135. The threads 302 of the housing are configured to receive the threaded portion 306 of the inside of the knob 305. The inside wall of the housing includes an elongated teeth 303 separated by spaces. The spaces 304 are configured to mate with the teeth of the first plate 310 and second plate 325 such the first and second plate cannot move when positioned inside the housing.

The mirror 145 is connected to the shaft 335. The shaft is such that when the shaft pivots, the mirror pivots as well. The shaft is connected to the disc 320. The shaft is configured to pass through an opening 307 on the planar body 130 or one of the arms 135.

When the tensioning device is fully assembled, the shaft passes through the opening 307 in the wall of either the planar body or the arm 135 and is positioned inside of the housing such that the disc 320 attached to the shaft is sandwiched between the first plate 310 and the second plate 325. The teeth 315 of the first plate are configured to mate with the gaps between the elongated ridges 303 inside the housing so that the first plate is unable to move. Similarly, the teeth 330 of the second plate are configured to mate with the gaps between the elongated ridges 303 inside the housing so that the second plate is unable to move. In operation, when the tensioning device is fully assembled, the spring or tension supplying device which is supplying a downward force on the disk which is sandwiched between the first place and second plates. As a result, the compressive friction or force supplied by the first and second plates to the disc 320 prevents the disc 320 from moving or provides drag and thereby prevents the shaft and mirror from rotating. Additionally, when fully assembled, the knob 305 can rotated to move the knob up or down to either increase or decrease the amount of pressure of force supplied by the spring 340 or other pressure or supplying device to the first and second plates. Additionally, the surfaces of the disc, and first and second plates may also include surfaces with increased coefficient of friction so as to apply greater amounts of friction and create a stronger lock if necessary. Additionally, other types of friction locks may also be used. In operation, in order to unlock the device, the knob 302 will be rotated to decrease the amount of force provided by the spring 340 on the first plate, second plate and disc 320. As the pressure is decreased, the friction or force applied to the disc decreases thereby allowing a user to more easily rotate the mirror between the in-use or not-in-use state. In operation, in order to lock the device or increase the amount of drag, the knob 302 will be rotated to increase the amount of force provided by the spring 340 on the first plate, second plate and disc 320. As the pressure is increased, the friction or force applied to the disc increases thereby allowing a user to more easily rotate the mirror between the in-use or not-in-use state.

FIG. 4 is a drawing showing the user using a pair of the devices coupled to a target viewing device to remain fully behind cover while having the ability to locate subjects and conduct surveillance accurately around an obstacle. However, it is also understood that only one device may be used. In FIG. 4, a first device 401 is positioned in front of the target viewing device. The mirror 145 of the first device is in the not-in-use state. Similarly, only one device may be used to accomplish the function as illustrated in FIG. 4. The second device 405 is positioned behind the targeting device, and wherein the mirror of the second device is in the in-use state. As a result of such configuration of device 405, a user may position the fore end of the target viewing device around an obstacle 410 so that the fore end of the target viewing device receives an image in the line of sight in line with the longitudinal axis (represented by line C) of images on one side 412 of the obstacle. The user 415 is positioned safely on another side 413 of the obstacle. The mirror of the device 405 positioned behind or on the rearward end of the target viewing device is in the in-use state. As a result, the user can be positioned not in line with the longitudinal access of the target viewing device and still view the reflection of the image provided by the target viewing device to a user. Also worth noting is that in FIG. 4, both device 401 and 405 or coupled to the fore end of the target viewing device and on the rearward end or behind the target viewing device, respectively.

FIG. 5 is a drawing showing the user using a pair of the devices used with the target viewing device to remain fully remain fully behind cover while having the ability to locate subjects and conduct surveillance accurately around an obstacle. In FIG. 5 a first device 501 is positioned in front of the target viewing device 503. The mirror of the first device is in the in-use state, and the second device 505 is positioned behind of or on the rearward end of the targeting device, and wherein the mirror of the second device is in the not in-use state. Similarly, only one device may be used to accomplish the function as illustrated in FIG. 5. As a result of such configuration of devices 501, 503, a user may position the fore end of the target viewing device around an obstacle 510 so that the fore end of the target viewing device receives an image (not in line with longitudinal axis represented by line C) reflected from the mirror of the first device when such images may be positioned on side 512 of the obstacle while the user 515 is positioned safely on another side 513 of the obstacle. The mirror of the device 505 is positioned behind or on the rearward end of the target viewing device is in the not-in-use state. As a result, the user can be positioned in line with the longitudinal access of the scope and still view the reflection of the image around an obstacle and not in the original line of sight of the target viewing device. Also worth noting is that in FIG. 5, device 501 is coupled by a base coupled to the first part of the collet and to the top surface of the firearm in front of the target viewing device while the second device 505 is mounted directly on the rearward end of the target viewing device.

Referring to FIG. 7A, the device may also include a cover 705 for covering the mirror 145 and planar body 130 when not being used or when in the not-in-use state. FIG. 7A is a front view of a cover for the mirror of the device, according to an example embodiment. The cover may be used to protect the mirror from scratching. The cover may also be used to prevent the mirror from producing a glare that may warrant an adverse combatant of the presence of a user. The cover is configured at least a substantial majority of the mirror and planar body 130. The present embodiments, the mirror is tongue shaped, the cover comprises a body that is tongue shaped. At each side of the body is a flanged feature 715. In operation, the flanged feature is configured to attach to attach to the planar body 130 so as to retain and sandwich the mirror between the planar surface of the cover and the flanged feature when the cover is placed onto the planar shaped body 130 with the mirror sandwiched there between.

FIG. 7B is a rear view of the planar body 130 with the cover 705 attached thereto, wherein the mirror is sandwiched between the planar body and the cover, according to an example embodiment. In FIG. 7B, a handle 720 of the mirror is illustrated. The handle may protrude from the body of the mirror and provide a user with a lever to apply forces to rotate or pivot the mirror about the hinge. The cover is designed to protect the reflective surface of the mirror and to protect the mirror from damage. It is also understood that other embodiments and shapes and sizes may also be used at the cover for protecting the mirror when the device is in its not-in-use state.

FIG. 7C is a rear view of the cover 705 attached to the planar body of the device, wherein the mirror is sandwiched between the planar body and the cover, according to an example embodiment. FIG. 7C also illustrates a handle 730 for the mirror. The handle may be a raised surface so that a user may easily grip and provide force to the cover so that the user may remove the cover from the planar body and the mirror.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A device for attaching in front of or behind a target viewing device of a firearm, the device comprising:
    a collet, the collet comprising at least a central opening defined by a first part and a second part, wherein the second part is rotatably coupled to the first part such that the second part rotates relative to the first part and about the collet's z axis;
    at least one attaching member configured to fixedly couple the first part of the collet proximate to the target viewing device such that the central opening does not obstruct an image provided from and to the target viewing device;
    a planar body, the planar body coupled perpendicular to the second part; and,
    a mirror pivotally coupled to the planar body via a hinge so that the mirror may pivot about the hinge to position the mirror relative to the target viewing device to provide a reflection of an image to the target viewing device if the device is positioned in front of the target viewing device and to provide a reflection of an image provided by the target viewing device to the user if the device is positioned behind the target viewing device.

2. The device of claim 1, wherein the mirror is tongue shaped.

3. The device of claim 1, wherein the target viewing device is coupled to a top surface of the firearm, such that the target viewing device is configured for aiming the firearm, and wherein the attaching member comprises a base coupled to the first part of the collet and to the top surface of the firearm.

4. The device of claim 1, wherein the mirror is configured to be rotated about the hinge so as to retract the mirror and refrain from obstructing the image provided by the target viewing device directly to the user when the device is positioned behind the target viewing device.

5. The device of claim 4, wherein the mirror is configured to be rotated about the hinge so as to retract the mirror and refrain from obstructing the image provided to the target viewing device when the device is positioned in front of the target viewing device.

6. The device of claim 1, wherein when the device is positioned behind the target viewing device, the second part may be rotated about the collet's z axis, and the mirror may be pivoted about the hinge to reflect the image provided by the target viewing device to the user, at any position of the user in relation to the firearm.

7. The device of claim 1, wherein when the device is positioned in front of the target viewing device, the second part may be rotated about the collet's z axis, and the mirror may be pivoted about the hinge to reflect the image provided to the target viewing device, wherein the image is in any position in direct view of the mirror.

8. A device configured to use with a target viewing device, the device comprising:
    at least a central opening defined by a first ringed part and a second ringed part, wherein the second ringed part is rotatably coupled to the first ringed part such that the second ringed part rotates relative to the first ringed part and about the first ring part's z axis;
    at least one attaching member configured to fixedly couple the first ringed part proximate to the target viewing device such that the central opening does not obstruct an image provided from and to the target viewing device;
    a mirror pivotally coupled to the second ringed part via a hinge so that the mirror may pivot about the hinge to position the mirror relative to the target viewing device to provide a reflection of an image to the target viewing device if the device is positioned in front of the target viewing device and to provide a reflection of an image provided by the target viewing device to the user if the device is positioned behind the target viewing device.

9. The device of claim 8, wherein the mirror is tongue shaped.

10. The device of claim 8, wherein the target viewing device is coupled to a top surface of a firearm, such that the target viewing device is configured for aiming the firearm, and wherein the attaching member comprises a base coupled to the first ringed part and to the top surface of the firearm.

11. The device of claim 8, wherein the mirror is configured to be rotated about the hinge so as to retract the mirror and refrain from obstructing the image provided by the target viewing device directly to the user when the device is positioned behind the target viewing device.

12. The device of claim 11, wherein the mirror is configured to be rotated about the hinge so as to retract the mirror and refrain from obstructing the image provided to the target viewing device when the device is positioned in front of the target viewing device.

13. The device of claim 8, wherein when the device is positioned behind the target viewing device, the second ringed part may be rotated about first ringed part's z axis, and the mirror may be pivoted about the hinge to reflect the image provided by the target viewing device to the user, at any position of the user in relation to the target viewing device.

14. The device of claim 8, wherein when the device is positioned in front the target viewing device, the second ringed part may be rotated about first ringed part's z axis, and the mirror may be pivoted about the hinge to reflect the image provided to the target viewing device to the user, wherein the image is in any position in direct view of the mirror.

15. A device configured to attach at a forward end or a rearward end of a target viewing device, the device comprising:
    at least a central opening defined by a first ringed part and a second ringed part, wherein the second ringed part is rotatably coupled to the first ringed part such that the second ringed part rotates relative to the first ringed part and about the first ring part's z axis;

at least one attaching member configured to fixedly couple the first ringed part proximate to the target viewing device such that the central opening does not obstruct an image provided from and to the target viewing device;

a mirror pivotally coupled to the second ringed part via a hinge so that the mirror may pivot about the hinge to position the mirror relative to the target viewing device to provide a reflection of an image to the target viewing device if the device is positioned at the forward end of the target viewing device and to provide a reflection of an image provided by the target viewing device to the user if the device is positioned at the rearward end of the target viewing device.

16. The device of claim 15, wherein the target viewing device is coupled to a top surface of the firearm, such that the target viewing device is configured for aiming the firearm, and wherein the attaching member comprises a plurality of threaded fasteners configured to pass through threaded holes of a first part of collet to engage an outward facing surface of the target viewing device.

17. The device of claim 15, wherein the mirror is configured to be rotated about the hinge so as to retract the mirror and refrain from obstructing the image provided by the target viewing device directly to the user when the device is positioned at the rearward end of the target viewing device.

18. The device of claim 17, wherein the mirror is configured to be rotated about the hinge so as to retract the mirror and refrain from obstructing the image provided to the target viewing device when the device is positioned at the forward end of the target viewing device.

19. The device of claim 15, wherein when the device is positioned at the rearward end of the target viewing device, the second part may be rotated about the collet's z axis, and the mirror may be pivoted about the hinge to reflect the image provided by the target viewing device to the user, at any position of the user in relation to the firearm.

20. The device of claim 15, wherein when the device is positioned in at the front end of the target viewing device, the second part may be rotated about the collet's z axis, and the mirror may be pivoted about the hinge to reflect the image provided to the target viewing device, wherein the image is in any position in direct view of the mirror.

* * * * *